United States Patent
Hloch et al.

[15] 3,650,683
[45] Mar. 21, 1972

[54] PROCESS FOR THE MANUFACTURE OF CONDENSED ALUMINUM PHOSPHATES

[72] Inventors: Albert Hloch, Frankfurt/Main; Nikolaj Medic, Kelkheim/Taunus; Rudolf Kohlhaas, Frankfurt/Main, all of Germany

[73] Assignee: Farbwerke Hoechst Aktiengesellschaft vormals Meister Lucius & Bruning, Frankfurt/Main, Germany

[22] Filed: May 9, 1969

[21] Appl. No.: 823,496

[30] Foreign Application Priority Data

May 13, 1968 Germany .................. P 17 67 460.1

[52] U.S. Cl. ................................................... 23/105
[51] Int. Cl. ........................... C01b 25/36, C01b 25/38
[58] Field of Search ............................ 23/105; 71/33

[56] References Cited

UNITED STATES PATENTS 3,401,012  9/1968  Nelson ................................ 23/105
3,403,971  10/1968  Razel et al. ......................... 23/105

Primary Examiner—Oscar R. Vertiz
Assistant Examiner—Gregory A. Heller
Attorney—Curtis, Morris & Safford

[57] ABSTRACT

The preparation of condensed aluminum phosphates containing phosphorus pentoxide and aluminum trioxide in a molar ratio within the range of from 1.1 : 1 to 3 : 1 is carried out by reacting water-soluble alkali metal polyphosphates with water-soluble aluminum salts and water and subjecting them to a heat treatment.

4 Claims, No Drawings

PROCESS FOR THE MANUFACTURE OF CONDENSED ALUMINUM PHOSPHATES

The present invention relates to a process for the manufacture of condensed aluminum phosphates.

These condensed aluminum phosphates are suitable hardeners for cements containing water glass as a binder.

It is known from German Pat. No. 1,252,835 that condensed phosphates containing $P_2O_5$ and $Al_2O_3$ in a ratio within the range of from 1.1 to 3 can be used as hardeners for water glass cements. According to the said Patent the condensed aluminum phosphates are obtained by subjecting aluminum orthophosphates having the corresponding ratio of $P_2O_5$ : $Al_2O_3$ to a two-stage heat treatment at different temperatures.

The cements containing a condensed aluminum phosphate as hardener may be prepared from potassium and sodium silicates (potash or soda water glass), in which the ratio of silicon dioxide to alkali may vary within wide limits.

The cements are, in general, manufactured from 4 to 6 parts of hardener, 25 to 35 parts of water glass and 90 to 100 parts of a filler. Suitable fillers are the materials that are generally used for this purpose, for example, sand, quartz, aluminum silicates, kaolin, silicon carbide and heavy spar. Which filler or mixture of filler, hardener and water glass is to be used depends on the intended use of the water glass cement.

The present invention provides a process for the manufacture of condensed aluminum phosphates containing phosphorus pentoxide and aluminum trioxide in a molar ratio within the range of from 1.1 : 1 to 3 : 1, which comprises reacting soluble alkali metal polyphosphates condensed in the form of a chain or a cycle with soluble aluminum salts in water and subjecting the condensed aluminum phosphates so obtained to a one-stage heat treatment at temperatures within the range of from 300° to 600° C.

For the reaction, soluble alkali metal polyphosphates condensed in the form of a chain or a cycle with a degree of condensation of 2 to 10 are preferably used. As polyphosphates there are advantageously used tetra-sodium pyrophosphate $(Na_4P_2O)$, tri-sodium metaphosphate $[(NaPO_3)_3]$, hexa-sodium metaphosphate $[(NaPO_3)_6]$ and hexa-sodium tetraphosphate $[Na_6P_4O_{13}]$.

As soluble aluminum salts for this reaction, aluminum sulfate, aluminum nitrate or potassium aluminum alum are preferably used.

The heat treatment is advantageously carried out at temperatures within the range of from 400° to 500° C. After drying, the condensed aluminum phosphates prepared from alkali metal phosphates and aluminum salts in an aqueous solution are advantageously subjected to a heat treatment for 1 to 3 hours.

The process in accordance with the invention has the advantage that a one-stage heat treatment is sufficient to obtain condensed aluminum phosphates having the desired hardening properties.

The process of the invention can advantageously be carried out in a manner such that a particularly fine grained, condensed aluminum phosphate is already obtained when precipitating from the aqueous solution.

In the process in accordance with the invention, the relatively small consumption of energy is particularly advantageous, as for separating and drying a precipitate only small quantities of energy are necessary as compared with the evaporation and drying of an aqueous solution and as the heat treatment of the precipitate can already be carried out at moderately elevated temperatures.

The following examples serve to illustrate the invention, but are not intended to limit it:

EXAMPLE 1

In a glass vessel provided with a stirrer, 133.3 grams of aluminum sulfate $[Al_2(SO_4)_3 \times 18H_2O]$ were dissolved in 400 milliliters of water while heating. The pH-value of the solution was 2.7. At a temperature of 30° C. a polyphosphate solution of a pH-value of about 6.5 was continuously added while stirring. This polyphosphate solution had been prepared from 122.4 grams of sodium trimetaphosphate $[(NaPO_3)_3]$ and 400 milliliters of water while heating.

In the glass vessel a white precipitate of condensed aluminum phosphates was formed. The precipitate was separated, thoroughly washed with about 400 milliliters of distilled water and dried at 125° C. for about one day. The molar ratio $P_2O_5$ : $Al_2O_3$ of the dry condensed aluminum phosphate was 2 : 1.

The dried condensed aluminum phosphate was subjected to a heat treatment at about 400° C. for two hours. The condensed aluminum phosphate so prepared and tempered was a suitable hardener for acid-resisting water glass cements. A mixture of 6 grams of this condensed aluminum phosphate (as hardener), 94 grams of quartz sand and 30 grams of potash water glass yielded a waterproof cement resistant to sulfuric acid. After being exposed to the air for about 8 days, the hardened cement had a compressive strength of up to 290 kilograms per square centimeter.

EXAMPLE 2

235 grams of hexa-sodium tetraphosphate $[Na_6P_4O_{13}]$ were dissolved in 800 milliliters of water and mixed, while stirring, with a solution containing 333.3 grams of aluminum sulfate $[Al_2(SO_4)_3 \times 18H_2O]$ in 800 milliliters of water. The pH-value of this mixture of the solutions was about 2. The pH-value was adjusted to 4.5 with a concentrated ammonium hydroxide solution, while stirring. At this pH-value a precipitate of condensed aluminum phosphates was formed. The precipitate was separated, thoroughly washed with 1 liter of distilled water and dried at about 125° C. for 1 day. By a heat-treatment of 3 to 4 hours at 500° C. a condensed aluminum phosphate was obtained, which was suitable as hardener for water glass cements. The molar ratio of $P_2O_5$ : $Al_2O_3$ in this hardener was 1.17 : 1.

EXAMPLE 3

612 grams of hexa-sodium metaphosphate $[(NaPO_3)_6]$ were dissolved in 1 liter of hot water and mixed with a solution containing 666.0 grams of aluminum sulfate $[Al_2(SO_4)_3 \times 18H_2O]$ in 1 liter of water. The pH-value was adjusted to 4.5 with a concentrated ammonium hydroxide solution. The white precipitate of condensed aluminum phosphates which formed, was separated, thoroughly washed with 2 liters of distilled water and dried at about 130° C. for about 1 day. By heating the condensed aluminum phosphate at 500° C. for 2 hours a hardener for acid-resisting water glass cements was obtained. The molar ratio of $P_2O_5$ : $Al_2O_3$ was 1.9 : 1.

What is claimed is:

1. A process for the preparation of a condensed aluminum phosphate containing phosphorus pentoxide and aluminum trioxide in a molar ratio within the range of from 1.1:1 to 3:1, which comprises reacting a water-soluble alkali metal polyphosphate condensed in the form of a chain or a cycle having a degree of condensation within the range of from 2 to 10, with a water-soluble aluminum salt selected from the group consisting of aluminum sulfate, aluminum nitrate and potassium aluminum alum, precipitating a reaction product of said water-soluble alkali metal polyphosphate and said aluminum salt and drying the precipitated product and subjecting the aluminum phosphate so obtained to a one-stage heat treatment at temperatures within the range of from 300° to 600° C.

2. A process as claimed in claim 1, wherein the precipitated product is subjected to a heat treatment for 1 to 3 hours.

3. A process as claimed in claim 1, wherein the heat treatment is carried out at temperatures within the range of from 400° to 500° C.

4. A process as claimed in claim 1, wherein the alkali metal polyphosphate is tetra-sodium pyrophosphate $[Na_4P_2O_7]$, trisodium metaphosphate $[(NaPO_3)_3]$, hexa-sodium metaphosphate $[(NaPO_3)_6]$ or hexa-sodium tetraphosphate $[Na_6P_4O_{13}]$.